United States Patent
Imanishi et al.

(10) Patent No.: US 11,403,949 B2
(45) Date of Patent: Aug. 2, 2022

(54) SYSTEM FOR PREDICTING VEHICLE BEHAVIOR

(71) Applicant: Hitachi Automotive Systems, Ltd., Hitachinaka (JP)

(72) Inventors: Yuto Imanishi, Novi, MI (US); Subrata Kumar Kundu, Canton, MI (US); Yoichi Iihoshi, Tsuchiura (JP); Takashi Okada, Hitachinaka (JP); Yuuki Okuda, Mito (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 181 days.

(21) Appl. No.: 16/408,257

(22) Filed: May 9, 2019

(65) Prior Publication Data

US 2020/0357282 A1 Nov. 12, 2020

(51) Int. Cl.
*B60W 30/08* (2012.01)
*G08G 1/16* (2006.01)
*G08G 1/01* (2006.01)
*B60W 50/00* (2006.01)

(52) U.S. Cl.
CPC ............ *G08G 1/166* (2013.01); *B60W 30/08* (2013.01); *B60W 50/0097* (2013.01); *G08G 1/0125* (2013.01); *B60W 2050/0075* (2013.01); *B60W 2552/05* (2020.02); *B60W 2554/801* (2020.02); *B60W 2556/10* (2020.02); *B60W 2720/106* (2013.01)

(58) Field of Classification Search
CPC ..... G08G 1/166; G08G 1/0125; B60W 30/08; B60W 50/0097; B60W 2552/05; B60W 2554/801; B60W 2050/0089; B60W 2720/106; B60W 2720/10; B60W 2554/4041; B60W 2554/4042; B60W 2554/4045; B60W 50/14; B60W 2556/10; B60W 2554/406; B60W 60/00274
See application file for complete search history.

(56) References Cited

U.S. PATENT DOCUMENTS

| | | | | |
|---|---|---|---|---|
| 2017/0197549 A1* | 7/2017 | Vladimerou | .......... | B60W 50/14 |
| 2018/0154895 A1* | 6/2018 | Chae | ..................... | B60W 10/20 |
| 2018/0225963 A1* | 8/2018 | Kobayashi | ............... | G08G 1/04 |
| 2019/0232960 A1* | 8/2019 | Yokota | ................ | B60W 30/085 |
| 2020/0272160 A1* | 8/2020 | Djuric | ................... | B60W 60/00 |

* cited by examiner

*Primary Examiner* — Peter D Nolan
*Assistant Examiner* — Ashley L Redhead, Jr.
(74) *Attorney, Agent, or Firm* — Procopio, Cory, Hargreaves & Savitch LLP

(57) ABSTRACT

Example implementations described herein involve a system for predicting vehicle behavior with a higher efficiency which can reduce the number of sensors and the amount of data needed for vehicle control systems. Example implementations described herein can be used for any type of vehicle control system, such as a powertrain control system, an adaptive cruise control system, an autonomous driving system, because the target vehicle to be predicted can be replaced to a preceding vehicle, a surrounding vehicle, and an ego vehicle.

16 Claims, 20 Drawing Sheets

| vehicle location | | vehicle state | | state change |
|---|---|---|---|---|
| latitude | longitude | speed | acceleration | jerk |
| 43.23 | -83.92 | 17.2 | 0.14 | 0.02 |
| 44.12 | -83.91 | 15.6 | -0.07 | 0.09 |
| 43.87 | -84.11 | 21.3 | -0.11 | 0.03 |
| ⋮ | ⋮ | ⋮ | ⋮ | ⋮ |

FIG. 4

| location | | | state | | state change |
|---|---|---|---|---|---|
| road id | latitude | longitude | speed | acceleration | jerk |
| 12100 | 43.23 | -83.92 | 17.2 | 0.14 | 0.02 |
| 11010 | 44.12 | -83.91 | 15.6 | -0.07 | 0.09 |
| 14012 | 43.87 | -84.11 | 21.3 | -0.11 | 0.03 |
| ⋮ | ⋮ | ⋮ | ⋮ | ⋮ | ⋮ |

FIG. 13

SYSTEM FOR PREDICTING VEHICLE BEHAVIOR

BACKGROUND

Field

The present disclosure generally relates to vehicle systems, and more specifically, to systems and methods for predicting vehicle behavior.

Related Art

In the advanced vehicle control system such as an advanced driver assistance systems (ADAS) and an autonomous driving system (AD), there is a strong demand for predicting the surrounding vehicle behavior as well the as ego vehicle behavior to improve fuel efficiency, comfortability, and safety.

One of the related art solutions for this demand is a system which predicts future vehicle behavior by utilizing a vehicle behavior model such as an artificial intelligence (AI) model and a stochastic model. In general, an AI model is trained with a dataset that records past driving situations, and a machine learning algorithm such as an artificial neural network, a hidden Markov model, and so on, so as to output a close response to the past driving data in a similar situation. Similarly, a stochastic model predicts the likely behavior by calculating probability of vehicle behavior based on the dataset. Such related art implementations facilitate a function which predicts future vehicle behavior from the past driving data and the current situation, so that the control response of ADAS/AD is improved in terms of fuel efficiency, comfortability, and safety.

FIG. 2 is an example related art prediction system for calculating the likely behavior of a vehicle, which consists of a training dataset 1100, a training module 1110, a state sensor 100, and factor sensors 1120, a prediction module 1130, and motion control module 150. The training dataset 1100 consists of past driving data, which include a vehicle state, behavior factors, and a state change. The vehicle state consists of speed and acceleration of a vehicle. The behavior factors consist of values of road width, road curvature, a speed limit, distance to an intersection, distance to a stop sign, etc., which influence behavior of the vehicle. In a training phase, the training module 1110 calculates a model parameter set 1210 based on the training data set 1100. The model parameter set is trained so that the prediction module 1130 outputs a close response to the past driving data in a similar situation. The model parameter set 1210 is memorized in the prediction module 1130 before an execution phase. In the execution phase, the state sensor 100 measures a vehicle state of a target vehicle, whose behavior is predicted, based on camera images, and then the state sensor 100 transmits a state signal 200 to the storage to the prediction module 1130 at a constant frequency. The state signal 200 consists of the measured speed and acceleration of the target vehicle. The factor sensors 1120 measures behavior factors based on camera images, and then the factor sensors 1120 transmit factor signals 1220 to the prediction module 1130 at a constant frequency. The factor signals 1220 consist of measured values of behavior factors, such as road width, road curvature, a speed limit, distance to an intersection, distance to a stop sign, etc., which are factors influencing behavior of the target vehicle and included in the training dataset 1100. The prediction module 1130 predicts likely behavior of the target vehicle, and then the prediction module 1130 transmits a likely behavior signal 1230 to the motion control module 150. The prediction module 1130 predicts a likely state change based on values of the state signal 200 and the factor signals 1220, as the model parameter set 1210 is trained so as to output a close value to the past driving data in a similar situation. The likely behavior signal 1230 is calculated by integrating the likely state change. The motion control module 150 calculates a control command signal 250 based on the likely behavior signal 1230 so as to improve fuel efficiency, comfortability, and safety.

FIG. 3 is an example related art prediction system for calculating likely behavior of a vehicle, which consists of a state sensor 100, and factor sensors 1120, a storage device 1140, a prediction module 1150, and motion control module 150. The state sensor 100 measures a vehicle state of a target vehicle, whose behavior is predicted, based on camera images, and then the state sensor 100 transmits a state signal 200 to the storage to the prediction module 1150 at a constant frequency. The state signal 200 consists of the measured speed and acceleration of the target vehicle. The factor sensors 1120 measures behavior factors based on camera images, and then the factor sensors 1120 transmit factor signals 1220 to the prediction module 1150 at a constant frequency. The factor signals 1220 consist of measured values of behavior factors, such as road width, road curvature, a speed limit, distance to an intersection, distance to a stop sign, etc., which are factors influencing behavior of the target vehicle. The storage device 1140 records a dataset of past driving. The dataset consists of a vehicle state, behavior factors which are the same types of factors as ones measured by the factor sensors 1120, and a state change. The storage device 1140 transmits recorded data 1240 to the prediction module 1150. The prediction module 1150 predicts likely behavior of the target vehicle, and the prediction module 1150 transmits a likely behavior signal 1250 to the motion control module 150. From the recorded data 1240, the prediction module 140 finds close data points to the current situation in terms of the vehicle state and the behavior factors, and predicts a likely state change based on values of the state changes in the close data points. A likely behavior signal 1250 is calculated by integrating the likely state change. The motion control module 150 calculates a control command signal 250 based on the likely behavior signal 1250 so as to improve fuel efficiency, comfortability, and safety.

SUMMARY

In the above related art implementations, the prediction module must be driven by the dataset which consists of a significant amount of behavior factors, which can result in several disadvantages. For example, from a sensing point of view, the vehicle behavior prediction system must measure all behavior factors which are included in the dataset, even if the number of sensors becomes overly large. Further, from a data acquisition point of view, engineers must acquire large amounts of driving data to fill the higher dimensional space with extra dimensions for additional behavior factors.

Additionally, vehicle behavior is affected by various factors such as road width, road curvature, speed limits, distance to an intersection, distance to a stop sign, and so on. In such cases, in order to provide highly accurate predictions to facilitate ADAS/AD, engineers must include a significant amount of behavior factors in the dataset. Otherwise the vehicle behavior model cannot predict what would otherwise be typical behavior, such as deceleration at a narrow road, acceleration for a speed limit change, and so on that would be affected by these factors.

In such situations, the related art systems can be inefficient in several areas, such as having an insufficient number of sensors because the in-vehicle sensors must measure all values of the behavior factors for control inputs as well as the dataset, or such as an amount of data required to fill the data space uniformly because extra dimensions for additional behavior factors increase the data requirements exponentially due to dimensionality. Example implementations described herein address the above mentioned problems by introducing a new system for such vehicle behavior predictions that can have more efficiency with respect to the number of sensors and the amount of data required.

In example implementations described herein, there is a system which involve a location sensor which measures a vehicle location, a state sensor which measures a vehicle state, a storage device which records each value of the vehicle state correlating with the vehicle location, a retrieval method which retrieves values of the vehicle states recorded near the vehicle location, a prediction module which predicts a likely behavior of the vehicle based on each value retrieved by the retrieval method, a motion control module which calculates a control command based on the predicted likely behavior.

With this system, several effects can occur, such as being able to reduce the number of sensors in the vehicle because the prediction module predicts likely behavior based on each value of a vehicle state correlated with a vehicle location, which replaces all behavior factors whose location are fixed. Further, another technical effect can be that the amount of required data is reduced because the dataset without additional behavior factors reduces the dimensions of the data space, which leads to more effective vehicle behavior prediction than former environment.

Aspects of the present disclosure can involve a method, involving obtaining state sensor information and location sensor information of a target vehicle, the state sensor information indicative of a vehicle state of the target vehicle, the location sensor information indicative of a location of the target vehicle; determining a behavior prediction of the target vehicle through determining potential state changes of the target vehicle based on comparing the vehicle state of the target vehicle and the location of the target vehicle to one or more historical data points of vehicle state and vehicle location pairs; and controlling a vehicle system based on the behavior prediction of the target vehicle.

Aspects of the present disclosure can involve a computer program having instructions involving obtaining state sensor information and location sensor information of a target vehicle, the state sensor information indicative of a vehicle state of the target vehicle, the location sensor information indicative of a location of the target vehicle; determining a behavior prediction of the target vehicle through determining potential state changes of the target vehicle based on comparing the vehicle state of the target vehicle and the location of the target vehicle to one or more historical data points of vehicle state and vehicle location pairs; and controlling a vehicle system based on the behavior prediction of the target vehicle. The computer program may be stored in a non-transitory computer readable medium configured to be executed by one or more processors.

Aspects of the present disclosure can involve a system, involving means for obtaining state sensor information and location sensor information of a target vehicle, the state sensor information indicative of a vehicle state of the target vehicle, the location sensor information indicative of a location of the target vehicle; means for determining a behavior prediction of the target vehicle through determining potential state changes of the target vehicle based on comparing the vehicle state of the target vehicle and the location of the target vehicle to one or more historical data points of vehicle state and vehicle location pairs; and means for controlling a vehicle system based on the behavior prediction of the target vehicle.

BRIEF DESCRIPTION OF DRAWINGS

FIG. 4 illustrates an example of a database in accordance with an example implementation.

FIG. 13 illustrates an example of the database, which records the vehicle location, the vehicle states, and the state change, in the storage device, in accordance with an example implementation.

DETAILED DESCRIPTION

Figure 1:
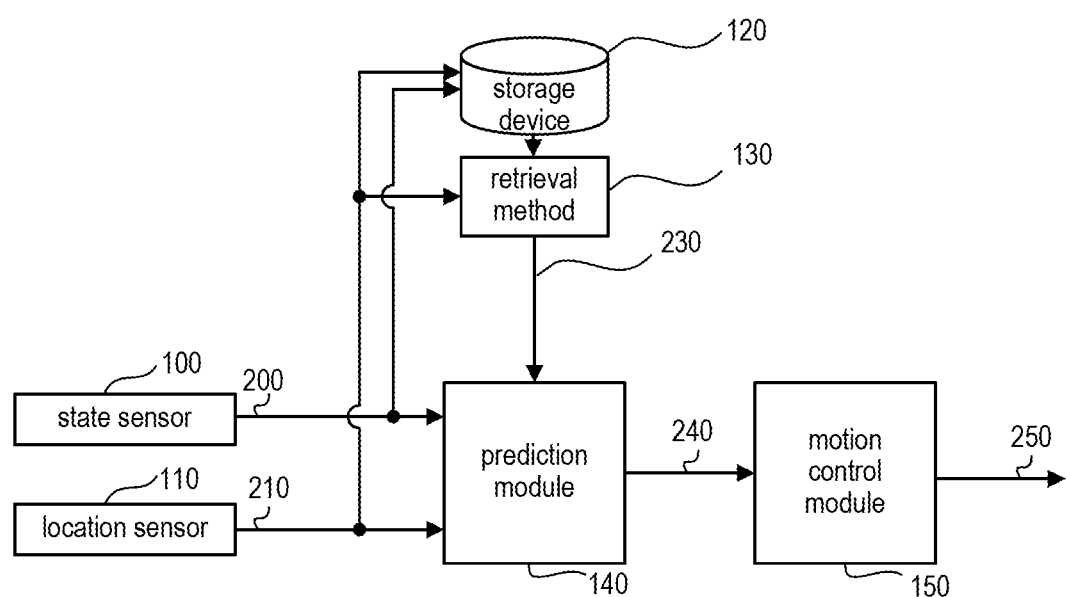
FIG. 1 illustrates an example of a prediction system for calculating likely behavior of a vehicle, in accordance with an example implementation.
Figure 2:
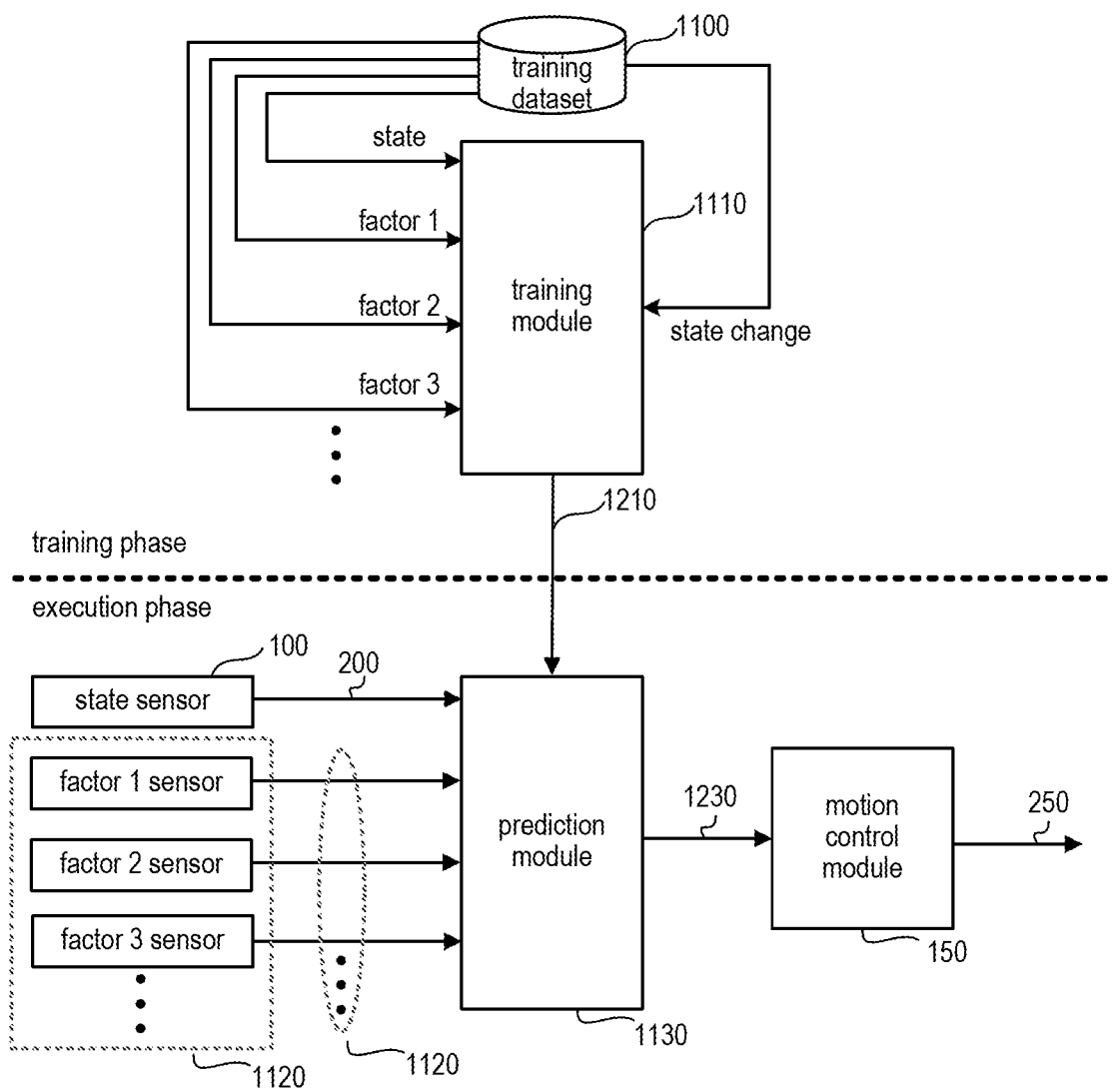
FIGS. 2 and 3 illustrate an example related art prediction system for calculating the likely behavior of a vehicle.
Figure 3:
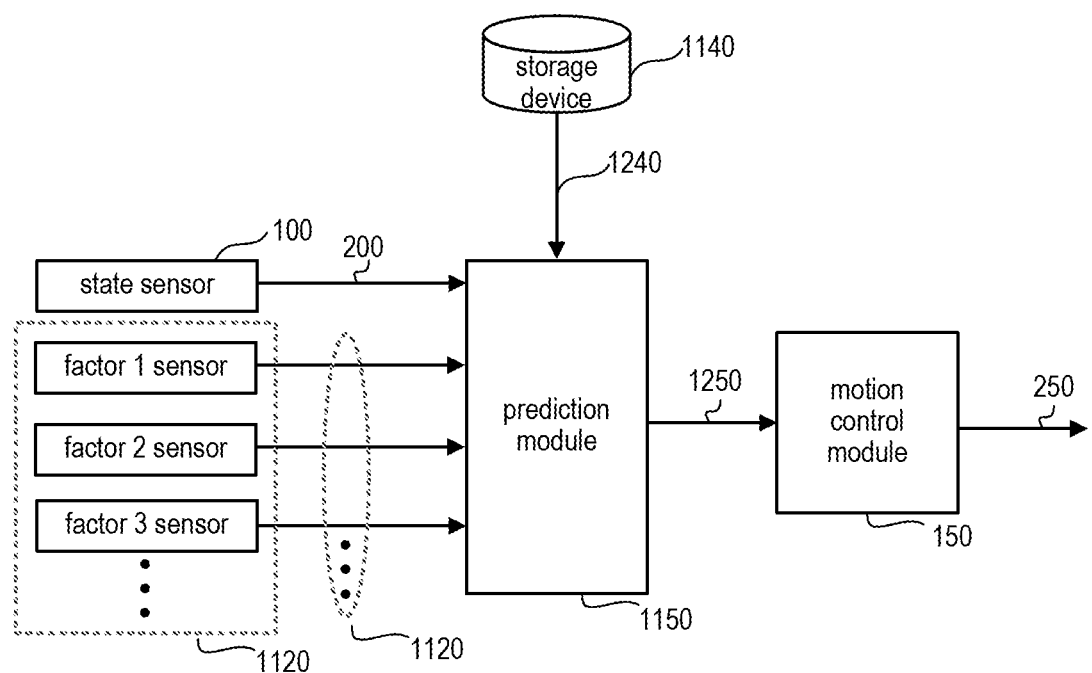

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example of a prediction system for calculating likely behavior of a vehicle, in accordance with an example implementation. The system of FIG. 1 can include a state sensor 100, a location sensor 110, a storage device 120, a retrieval method 130, a prediction module 140, and a motion control module 150.

The state sensor 100 measures a vehicle state of a target vehicle, whose behavior is predicted based on camera images, and then the state sensor 100 transmits a state signal 200 to the storage to the storage device 120 and the prediction module 140 at a constant frequency in accordance with the desired implementation. The state signal 200 can involve the measured speed and acceleration of the target vehicle. The location sensor 110 measures the location of the target vehicle using camera images and Global Positioning System (GPS), wherein the location sensor 110 transmits a location signal 210 to the storage device 120, the retrieval method 130, and the prediction module 140 at a constant frequency in accordance with the desired implementation.

The location signal 210 can involve the measured longitude and latitude of the target vehicle. The storage device 120 records driving data. Depending on the desired implementation, a state change can be calculated from several steps of vehicle states transmitted through the state signal 200 (e.g., jerk), and then the storage device 120 records the vehicle state and the state change after correlating the state change with the vehicle location transmitted through the location signal 210 as shown in FIG. 4, which illustrates an example of a database in accordance with an example implementation. As illustrated in FIG. 4, example of data that can be recorded in the database can include the vehicle location (e.g., latitude/longitude), the vehicle state (e.g., speed/acceleration) and the state change (e.g., jerk).

Figure 5:
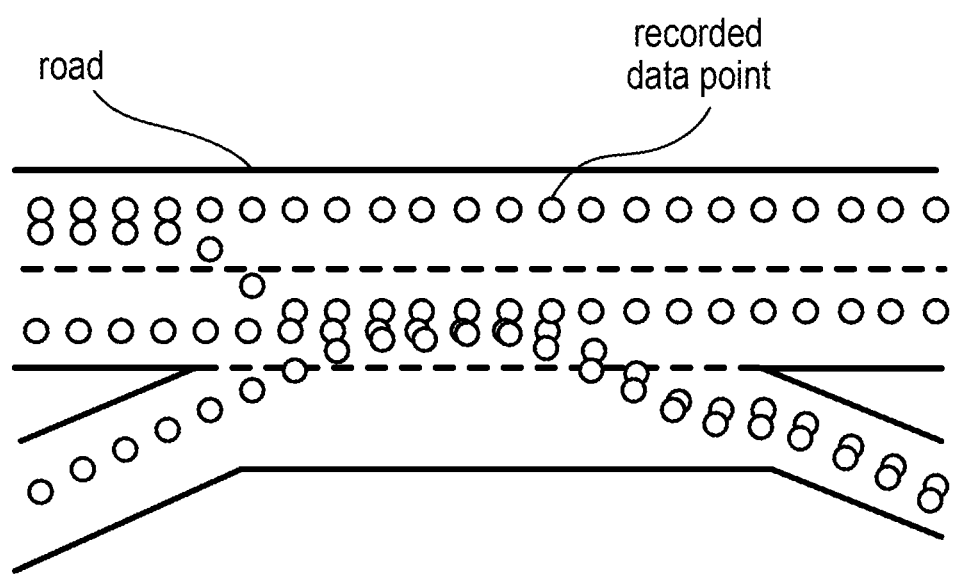
FIG. 5 illustrates an example of the recorded data points managed on the map geographically, in accordance with an example implementation.

FIG. 5 illustrates an example of the recorded data points managed on the map geographically, in accordance with an example implementation. The recorded data points are managed on a map geographically as shown in FIG. 5.

Figure 6:
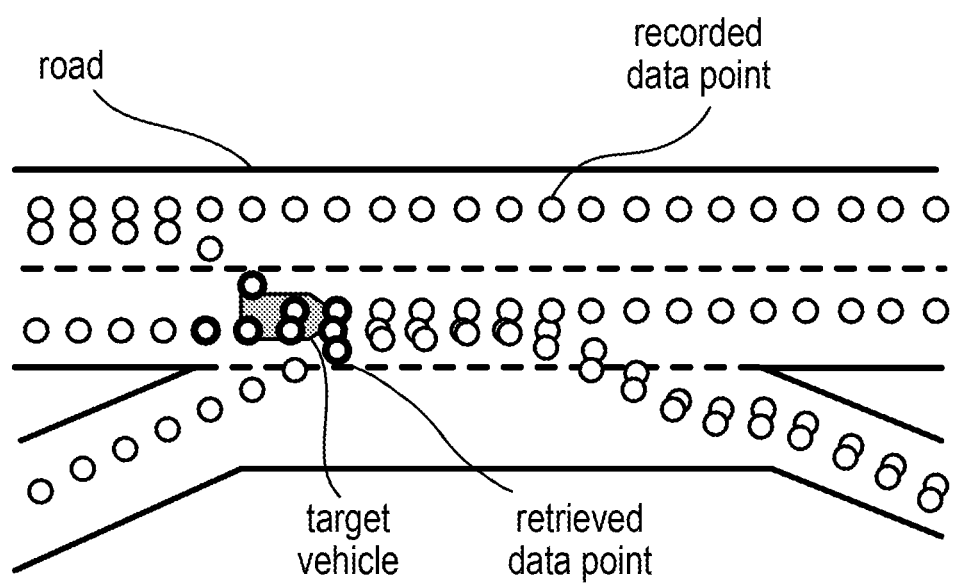
FIG. 6 illustrates an example of the data points recorded near the target vehicle location in accordance with an example implementation.

The retrieval method 130 retrieves the data points recorded near the target vehicle location from the storage device 120, and then the retrieval method 130 transmits a retrieved data 230 to the prediction module 140. The retrieval data 230 includes retrieved values such as a vehicle location, a vehicle state, and a state change. The retrieval method 130 retrieves the data points by comparing the vehicle location recorded in the storage device 120 and the location signal 210 as shown in FIG. 6, which illustrates an example of the data points recorded near the target vehicle location in accordance with an example implementation.

The retrieval method 130 picks up data points within a predetermined distance from the target vehicle. The prediction module 140 predicts likely behavior of the target vehicle, and then the prediction module 140 transmits a likely behavior signal 240 to the motion control module 150. From the retrieval data 230, the prediction module 140 finds close data points to the current situation in terms of the vehicle state and the vehicle location, and predicts a likely state change based on values of the state changes in the close data points. The likely behavior signal 250 is calculated by integrating the predicted likely state change. The close data points represent a tendency of vehicle behavior near the target vehicle.

Figure 7:
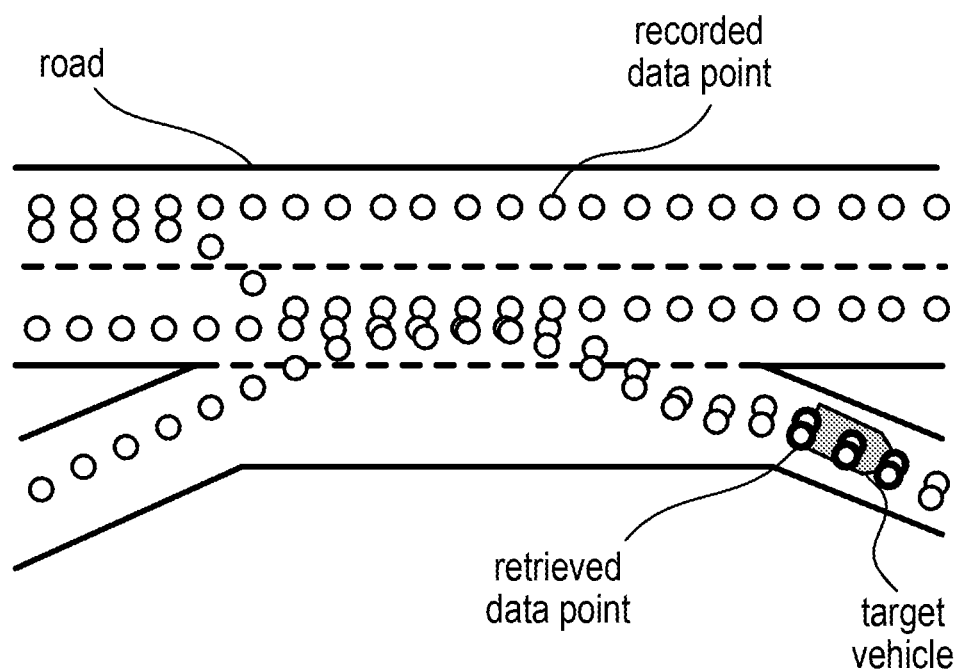
FIG. 7 illustrates an example of the data points recorded near the target vehicle location, in accordance with an example implementation.

FIG. 7 illustrates an example of the data points recorded near the target vehicle location, in accordance with an example implementation. For example, if the target vehicle is on a narrow road, on which vehicles decelerate frequently, as shown in FIG. 7, the close data points often include deceleration, thus the prediction module 140 predicts deceleration without the road width.

The motion control module 150 calculates a control command signal 250 based on the likely behavior signal 240 so as to improve fuel efficiency, comfortability, and safety.

When the prediction system is applied to adaptive cruise control (ACC), the prediction module 140 predicts the likely behavior of a preceding vehicle and the motion control module 150 calculates a control command of longitudinal motion based on the predicted likely behavior. The motion control module 150, for example, slows down the ego vehicle when the prediction module 140 predicts deceleration of the preceding vehicle, even if the preceding vehicle has not decelerated yet, in order to improve fuel efficiency, comfortability, and safety.

Figure 8A:
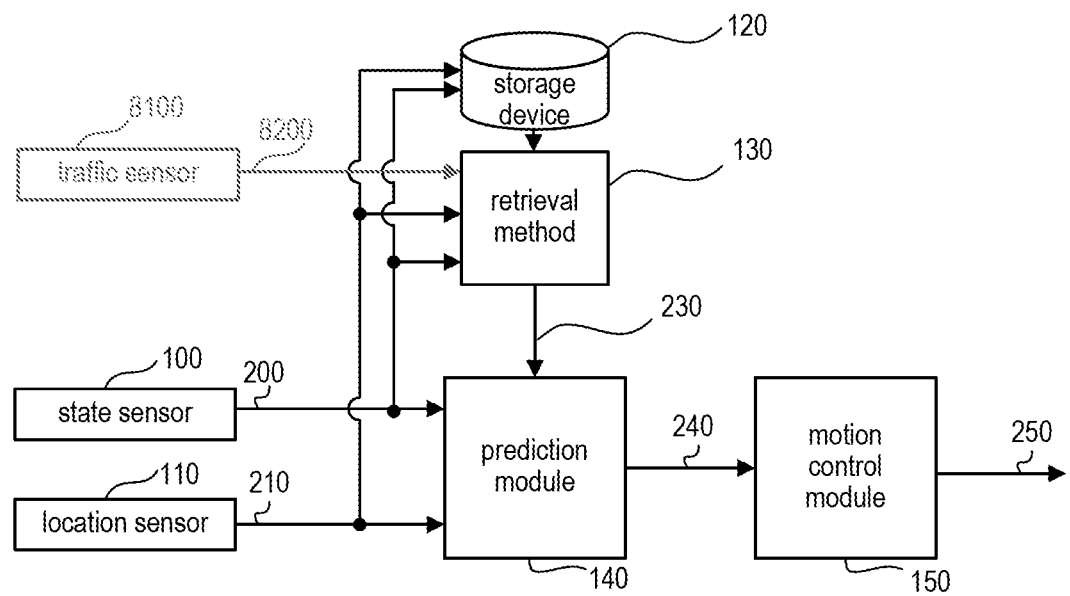
FIGS. 8(a), 8(b), and 9 illustrate more examples of a prediction system for calculating likely behavior of a vehicle, in accordance with an example implementation.

FIG. 8(a) illustrates another example of a prediction system for calculating the likely behavior of a vehicle, in accordance with an example implementation. Specifically, FIG. 8(a) illustrates a prediction system incorporating traffic sensor 8100. The traffic sensor 8100 transmits a traffic density signal 8200 to the retrieval method 130. The traffic sensor 8100 measures traffic density near the target vehicle. The retrieval method 130 retrieves the data points based on the state signal 200, the location signal 210, and the traffic density signal 8200. The retrieval method 130 picks up data points within a predetermined distance from the target vehicle. The predetermined distance is changed based on the state signal 200 and the traffic density 8200. The predetermined distance is extended with higher vehicle speed or higher traffic density, in order to refer a wider range of data points.

Figure 8B:
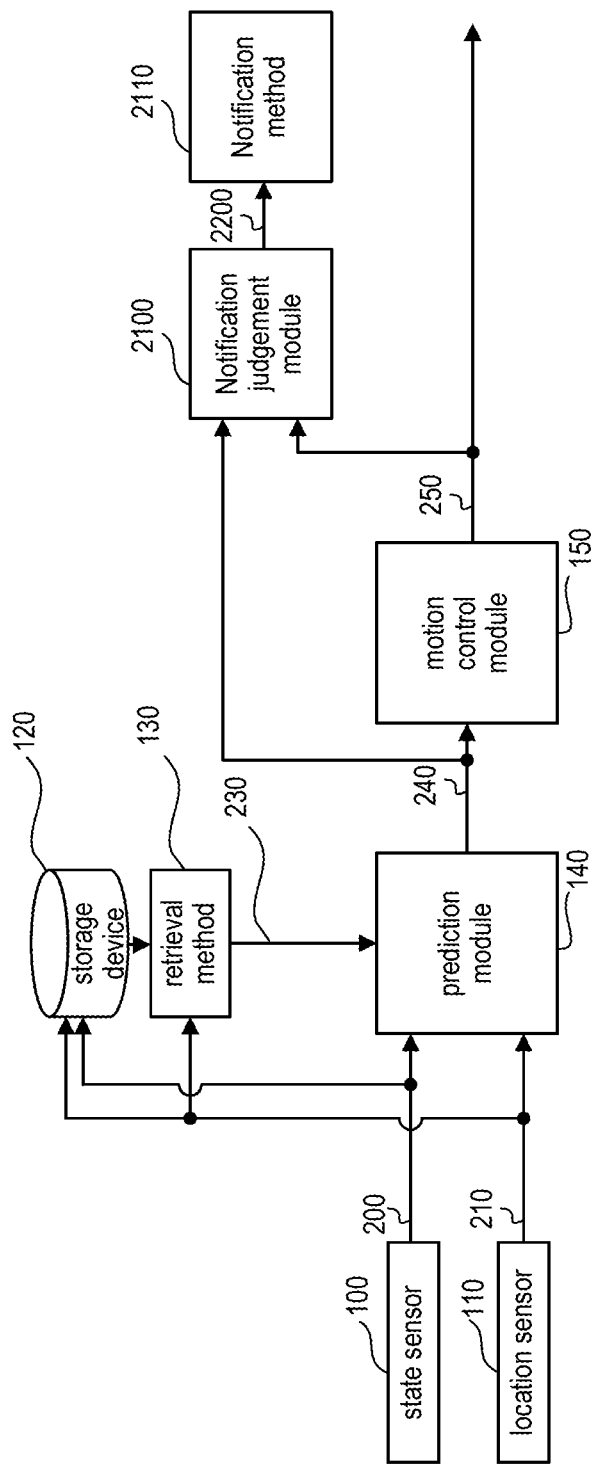

FIG. 8(b) is another example of a prediction system for calculating the likely behavior of a vehicle, in accordance with an example implementation. Specifically, FIG. 8(b) includes a notification judgment module 2100 and a notification method 2110. The notification judgment module 2100 transmits a notification signal 2200 to the notification method 2110. The notification method 2110 notifies a driver (e.g., by sound and/or by message display), when the notification judgment module 2100 requests notification. The notification judgment module 2100 requests notification when the motion control module 150 is instructed to slow down the ego vehicle before the preceding vehicle actually decelerates, so that the driver is not surprised when the ego vehicle begins to decelerate.

Figure 9:
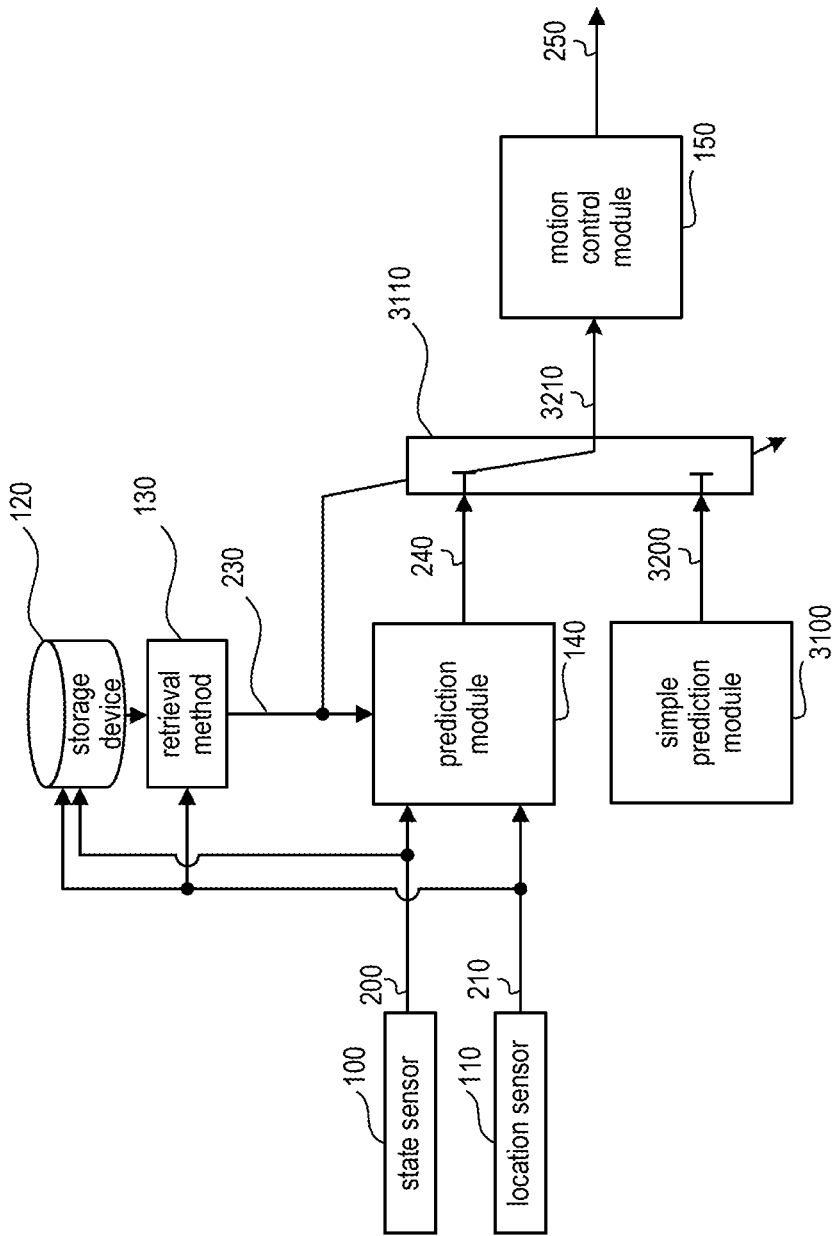

FIG. 9 illustrates another example of a prediction system for calculating the likely behavior of a vehicle, in accordance with an example implementation. Specifically, FIG. 9 involves a simple prediction module 3100 and a switching module 3110. The simple prediction module 3100 calculates a likely behavior of the target vehicle with a simple algorithm, such as a constant velocity model, and then the simple prediction module 3100 transmits a simple likely behavior signal 3200 to the switching module 3110. The switching module 3110 selects likely behavior to be used in the motion control module 150, and then the switching module 3110 transmits a selected likely behavior signal 3210 to the motion control module 150.

Figure 10:
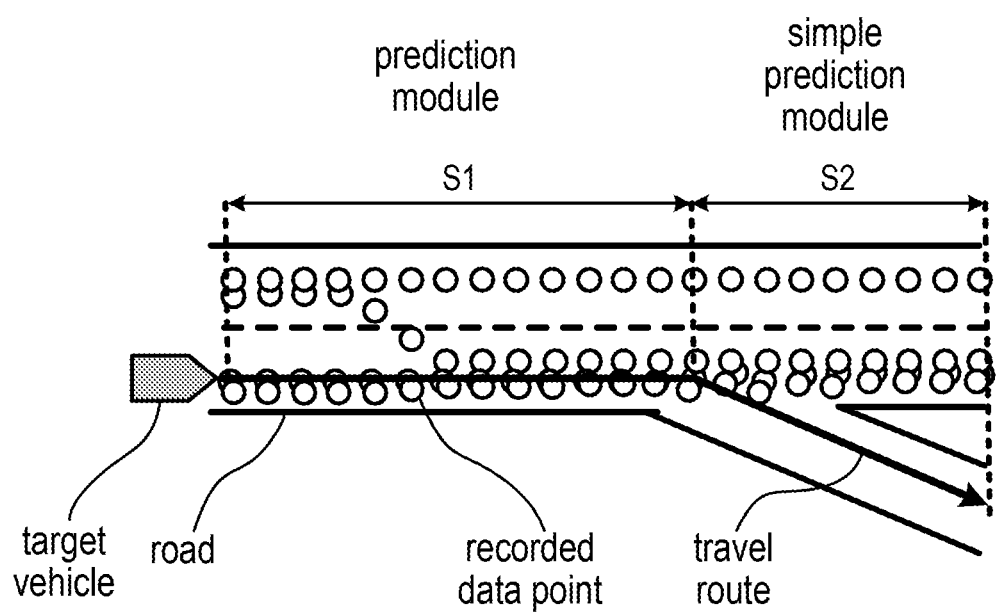
FIG. 10 illustrates another example of the prediction module selection, in accordance with an example implementation.

FIG. 10 illustrates another example of the prediction module selection, in accordance with an example implementation. If the retrieval data 230 contains enough data points as the section Si shown in FIG. 10, then the switching module 3110 selects the likely behavior signal 230 to transmit. Otherwise, the switching module 3110 selects the simple likely behavior signal 3200, in order to prevent degradation of the prediction performance. Examples of selecting the simple likely behavior signal 3200 can involve but is not limited to no/few data on the travel route, no/few close data points to the current situation, a transmission failure of the retrieval data 230.

Figure 11:
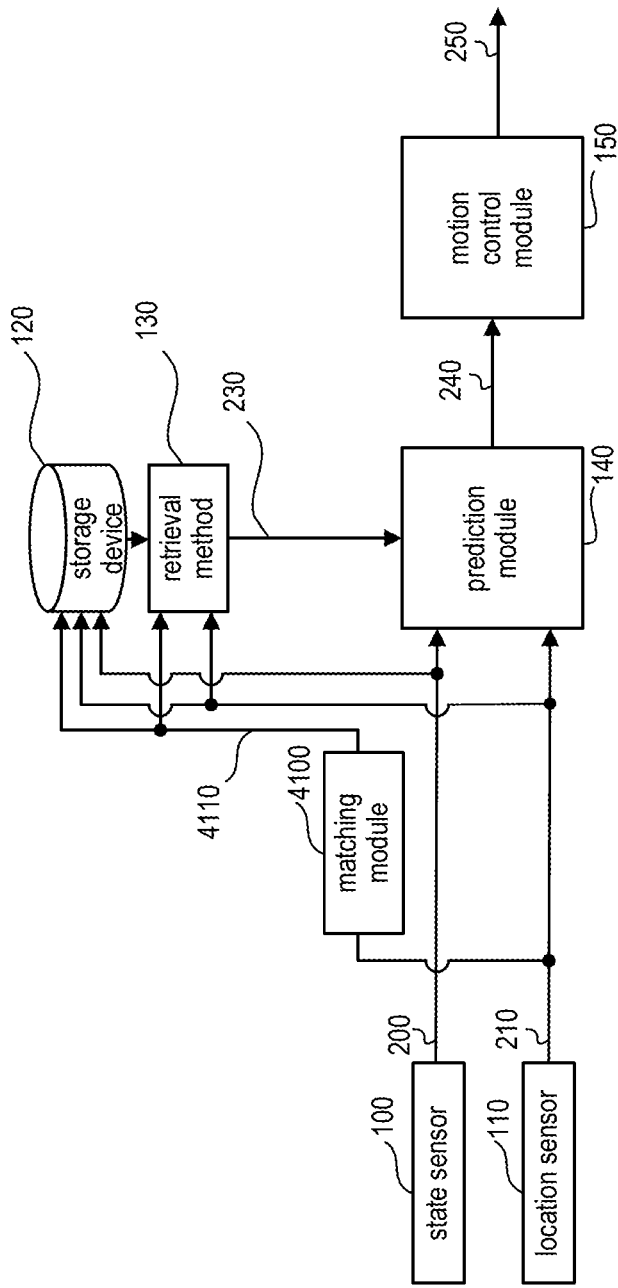
FIG. 11 illustrates another example of a prediction system for calculating the likely behavior of a vehicle, in accordance with an example implementation.

FIG. 11 illustrates another example of a prediction system for calculating the likely behavior of a vehicle, in accordance with an example implementation. Specifically, FIG. 11 involves a matching module 4100. The matching module 4100 finds an ID of the road on which the target vehicle is driving based on several steps of the location signal 210, and then the matching module 4100 transmits a road ID signal 4110 to the retrieval method 130. The retrieval method 130 retrieves values of the vehicle locations, the vehicle states, and the vehicle state changes recorded near the target vehicle based on the road ID signal 4110 as well as the location signal 210. The road ID is correlated with each road path on a digital map, thus a specific road is identified from the road ID signal 4110 even if the road crosses another road.

Figure 12:
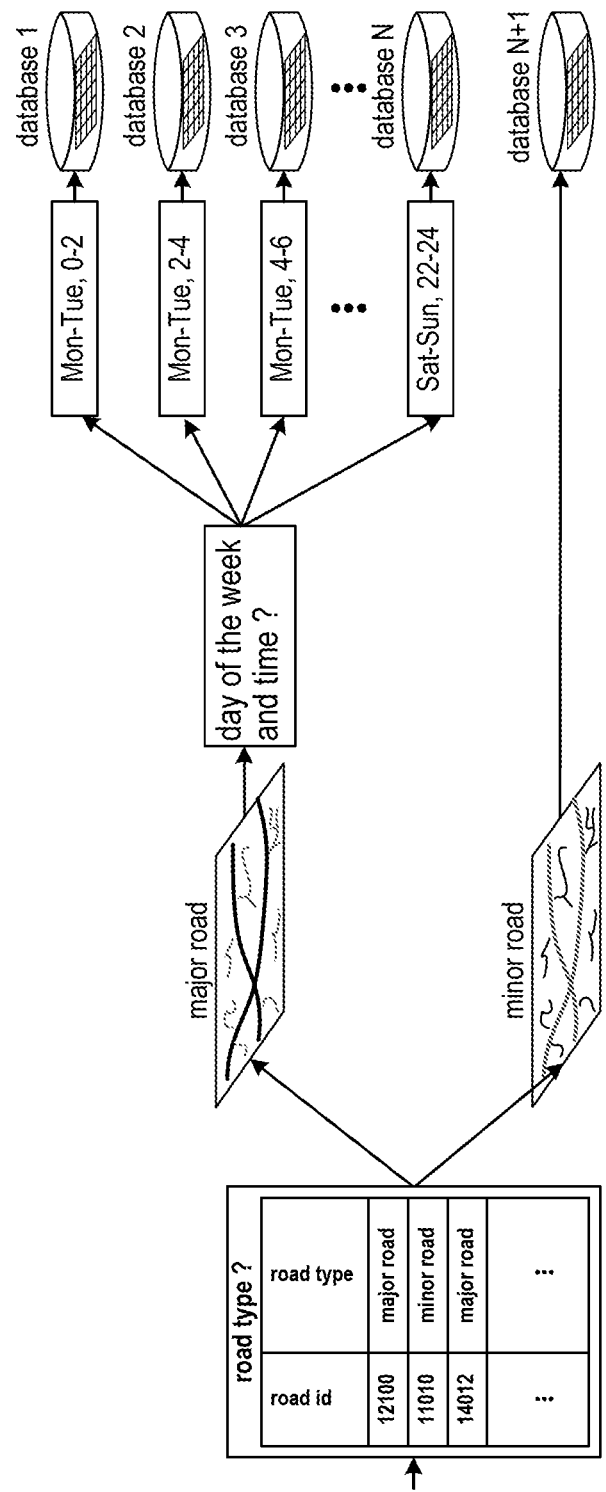
FIG. 12 illustrates another example of the storage device, which can be configured to select a database to be referred depending on day of the week and the time, in accordance with an example implementation.

FIG. 12 illustrates another example of the storage device 120, which can be configured to select a database to be referred depending on day of the week and the time, in accordance with an example implementation. As illustrated in FIG. 12, multiple databases can be utilized to sort out the data for a given road based on the road type (e.g., major road, vs. minor road) and/or the day of the week.

FIG. 13 illustrates an example of the database, which records the vehicle location, the vehicle states, and the state change, in the storage device 120, in accordance with an example implementation. If the value of the road ID signal 4110 belongs to major roads, the storage device 120 switches the database to be referred based on day of the week and time. In example implementations, vehicle behavior can depend strongly on the day of the week and the time. Thus vehicle behavior is predicted more accurately by switching the database based on day of week and time in accordance with the example implementations herein. The database may be switched based on weather or a vehicle type, such as a compact car, a standard size car, a large size car, a truck, and an emergency vehicle. If the value of the road ID signal 4110 belongs to minor roads, the storage device 120 refers to a designated database without switching. Thus, vehicle behavior is predicted without lowering the prediction accuracy, even if the amount of accumulated data is small due to little traffic being recorded in the database.

Figure 14:
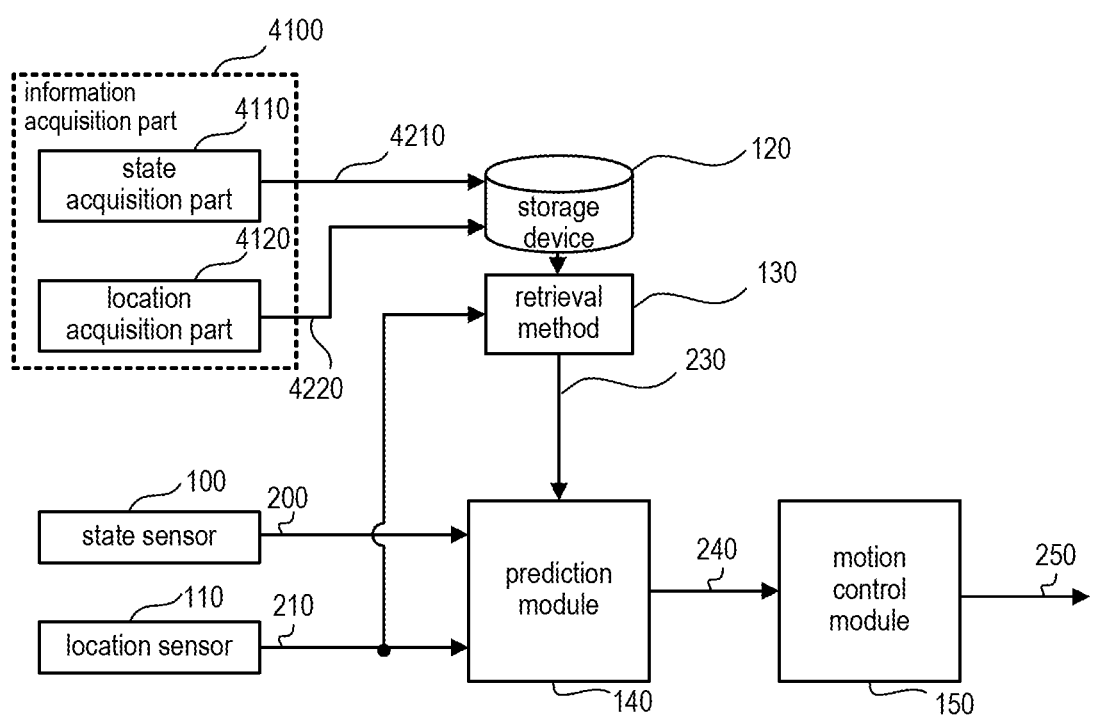
FIGS. 14 and 15 illustrate more examples of a prediction system for calculating the likely behavior of a vehicle, in accordance with an example implementation.

FIG. 14 illustrates another example of a prediction system for calculating the likely behavior of a vehicle, in accordance with an example implementation. Specifically, FIG. 14 illustrates an implementation involving an information acquisition part 4100. Furthermore, the information acquisition part involves a state acquisition part 4110 and a location acquisition part 4120. The information acquisition part acquires driving data, and then the information acquisition part 4120 transmits an acquired state signal 4210 and an acquired location signal 4220 to the storage device 120. The information acquisition part 4120 acquires driving data by, for example, measuring an ego vehicle motion, detecting a preceding vehicle, accessing a roadside infrastructure, and calculating a simulation. By measuring an ego vehicle motion, the information acquisition part 4120 acquires high precision data. By detecting a preceding vehicle, the information acquisition part 4120 acquires less biased data. By accessing a roadside infrastructure, the information acquisition part 4120 acquires data focusing on a specific area. By calculating a simulation, the information acquisition part 4120 acquires data without observing actual vehicles.

Figure 15:
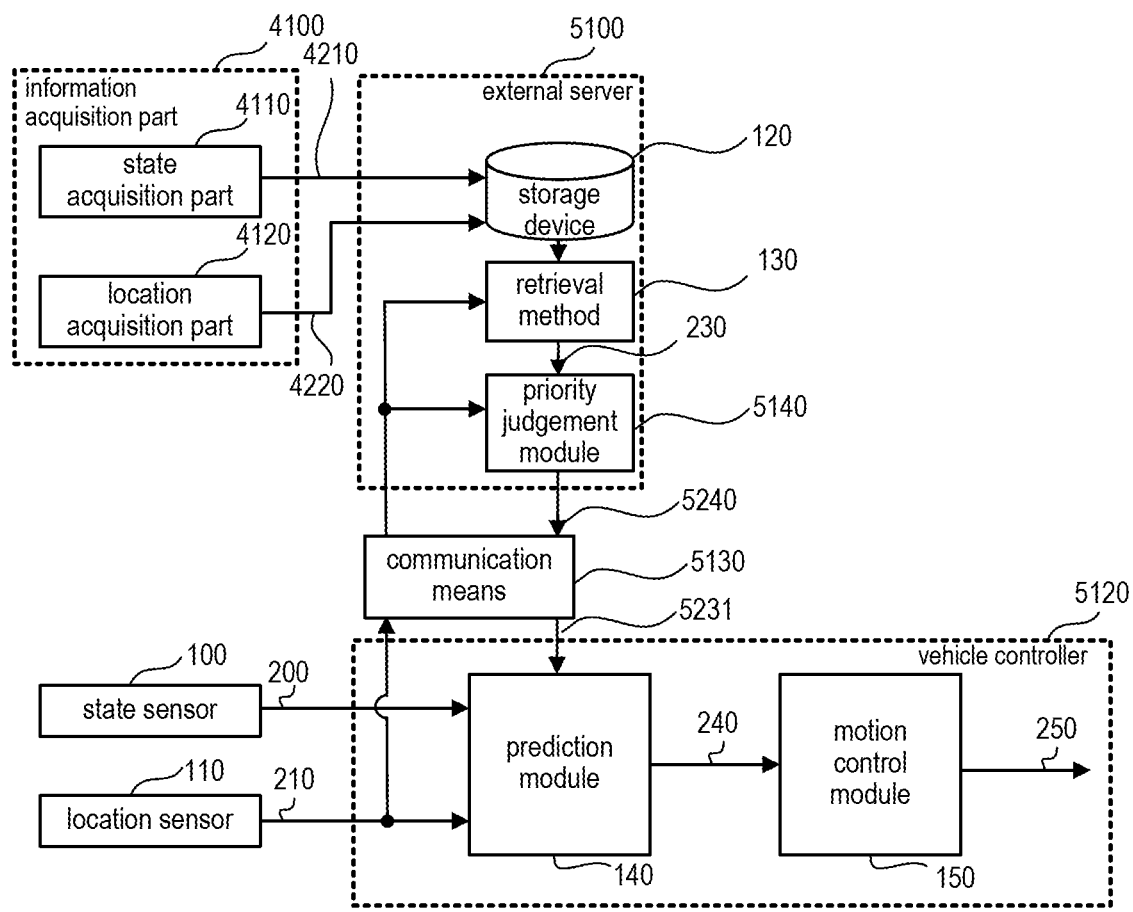

FIG. 15 illustrates an example of a prediction system for calculating the likely behavior of a vehicle, in accordance with an example implementation. Specifically, FIG. 15 involves an external server 5100, communication means 5130, and a vehicle controller 5120. In example implementations, the external server 5100 can include the storage device 120, the retrieval method 130, and a priority judgment module 5140. The vehicle controller 5120 can involve the prediction module 140 and the motion control module 150. The priority judgment module 5140 creates priorities to transmit the retrieval data 230 through the communication means 5130, and then the priority judgment module 5140 transmits a prioritized data 5240. The communication means 5130 transmits the location signal 210 to the retrieval method 130 and the priority judgment module 5140, and the prioritized data 5240 to the prediction module 140.

Figure 16:
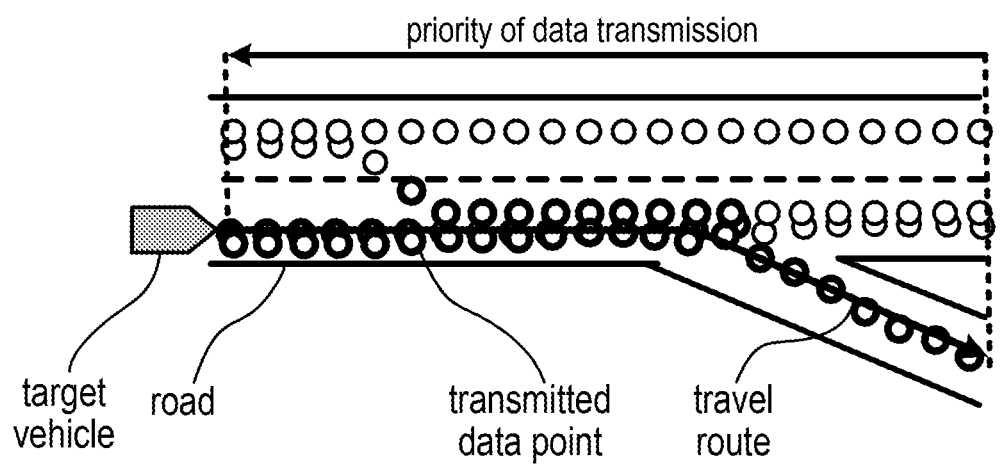
FIG. 16 illustrates an example of data point prioritization, in accordance with an example implementation.

FIG. 16 illustrates an example of data point prioritization, in accordance with an example implementation. In FIG. 16, the priority judgment module 5140 assigns a higher priority to data points closer to the target vehicle because the closer data points are used in early timing.

Through the example implementations described herein, the likely vehicle behavior is predicted from the vehicle location, the vehicle state, and the state change. Such example implementations can facilitate several advantages over the related art implementation. For example, from a sensing point of view, fewer sensors are needed because the prediction module predicts the likely behavior based on each value of a vehicle state correlated with a vehicle location, which replaces all behavior factors whose location is fixed. Further, from a data acquisition point of view, the amount of necessary data is reduced because the dataset without additional behavior factors reduces the dimensions of the data space.

Figure 17:
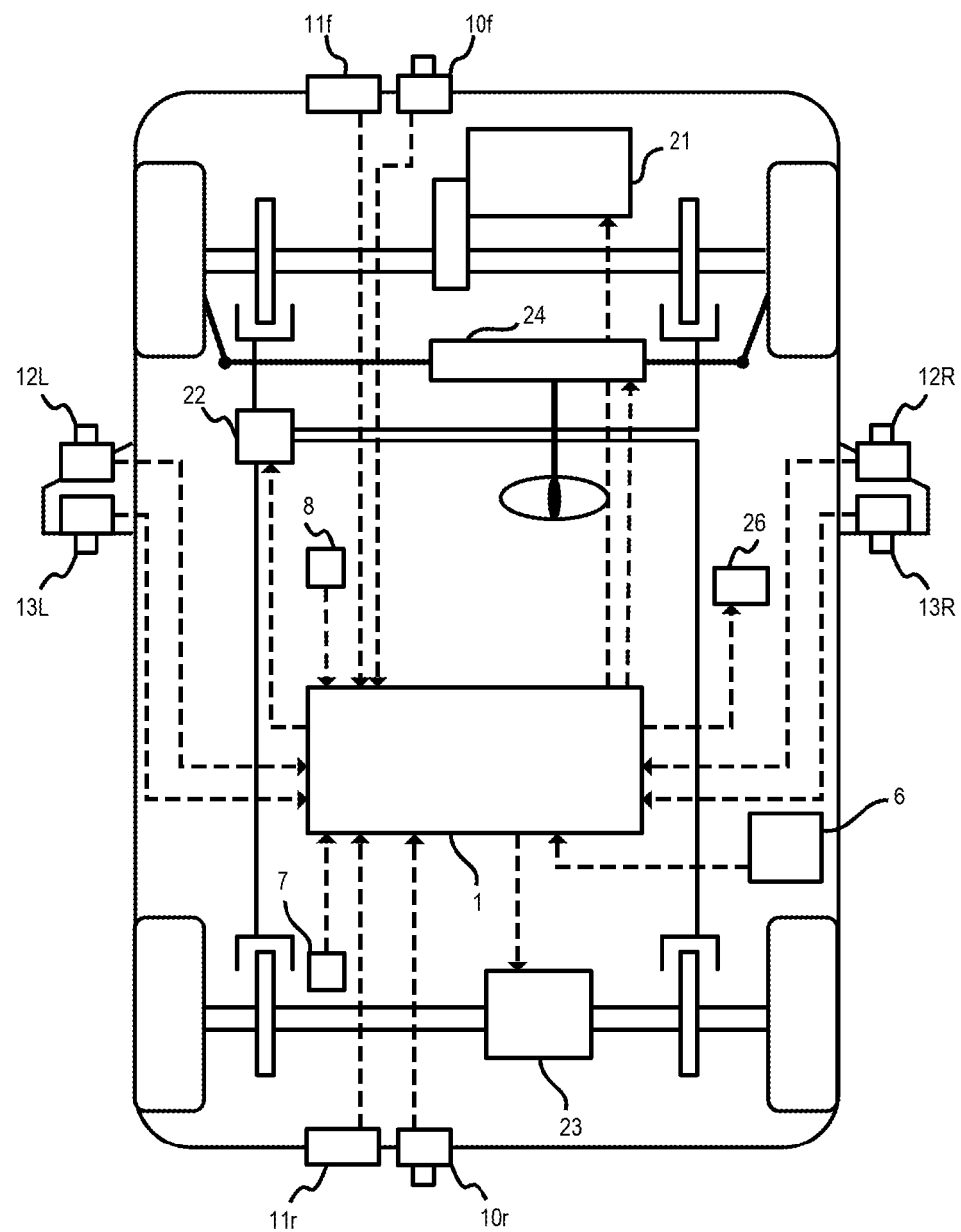
FIG. 17 illustrates a vehicle system, in accordance with an example implementation.

FIG. 17 illustrates a vehicle system, in accordance with an example implementation. Specifically, FIG. 17 illustrates an example human operated vehicle system configured to operate in a human operated mode and an autonomous mode. The ECU 1 is connected to a map positioning unit 6 to receive signals from the map positioning unit 6. Those signals represent a set route, map data, the position of the vehicle on a map, the direction of the vehicle, lane information, such as the number of lanes, speed limit, types of roads/vehicle locations (e.g., highways and general motorways, branch roads, toll booths, parking lots or garages, etc.), and as applicable, major roads/minor roads differentiation and other information for a given roadway as received from a cloud system or other vehicles.

The vehicle is provided with an operation parameter measuring unit for measuring values of parameters indicating the operating condition of the vehicle, which can include wheel speed measuring device 7, and vehicle behavior measuring device 8. Signals provided by those devices are sent to the ECU 1. The vehicle behavior measuring device 8 measures longitudinal acceleration, lateral acceleration and yaw rate.

The vehicle is provided with environmental condition measuring devices for measuring conditions of the environment around the vehicle, including a front camera 10f, a front radar 11f, a rear camera 10r, a rear radar 11r, a left front camera 12L, a right front camera 12R, a left rear camera 13L and a right rear camera 13R. Those environmental condition measuring devices send information about lane marks, obstacles, and asymmetrical markers around the vehicle to the ECU 1.

The cameras of the vehicle can be in the form of surround eye cameras, a stereo camera system, or other cameras depending on the desired implementation. In the camera system of the vehicle, the front camera 10f is provided with an image pickup unit for obtaining an image the roadway, and an output unit that provides the images received of the roadway. The front radar 11f detects and locates other vehicles and pedestrians and provides signals representing positional relation between the vehicle and those objects. The rear camera 10r, the left front camera 12L, the right front camera 12R, the left rear camera 13L and the right rear camera 13R are similar in functionality to the front camera 10f, and the front radar 11f and the rear radar 11r.

In example implementations, the state sensor 100 can be in the form of the vehicle behavior measuring device 8 if the target vehicle as described in the example implementations is the vehicle system itself. State sensor 100 can also involve specific hardware (e.g., programmable chips) that is configured to process images from the camera system of the vehicle system to determine the vehicle state of the target vehicle (e.g., for the target vehicle being a vehicle in proximity to the vehicle system or directly in front of the vehicle system).

In example implementations, the location sensor 110 can be in the form of the map positioning unit 6 if the target vehicle as described in the example implementations if the target vehicle is the vehicle system itself. Location sensor 110 can also involve specific hardware (e.g., programmable chips) that is configured to process images from the camera system and a GPS device to determine the location of a target vehicle (e.g., for the target vehicle being a vehicle in proximity to the vehicle system or directly in front of the vehicle system).

The vehicle is provided with an engine 21, an electronically controlled brake system 22, an electronically controlled differential mechanism 23, and an electronically controlled steering system 24. The ECU 1 gives drive signals to actuators included in those systems 22, 23 and 24 on the basis of values of manipulated variables given by the driver and/or environmental conditions such as the detection of various types of depressions or engagement of various autonomous modes for the vehicle system as described herein, or based on instructions received from an on board computer. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the ECU 1 gives a turn signal to at least one of the electronically controlled brake system 22, the electronically controlled differential mechanism 23 and the electronically controlled steering system 24. ECU 1 may also similarly configure the spring coefficient or other parameters of the suspension, as well as steering in accordance with the desired implementation.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle. The electronically controlled differential mechanism 23 drives an electric motor or a clutch to generate a torque difference between the right axle and the left axle in response to a turning request to apply a yawing moment to the vehicle. The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds and turns on warning lights representing information about supporting operations according to the type of the driving support operation. The information output unit 26 is, for example, a monitor provided with a built-in loud speaker. Plural information output units may be installed in the vehicle.

Figure 18:
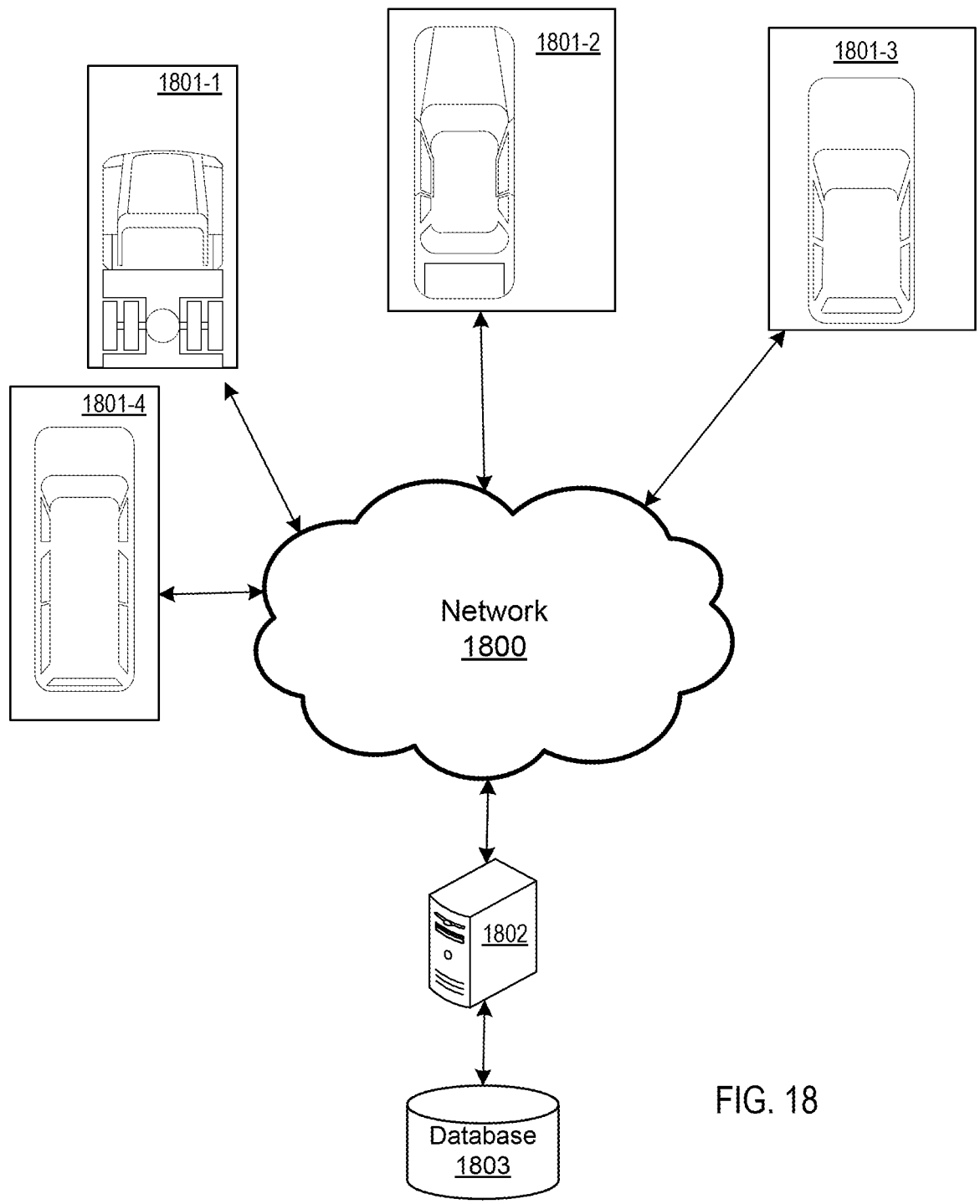
FIG. 18 illustrates a plurality of vehicle systems and a management apparatus, in accordance with an example implementation.

FIG. 18 illustrates a plurality of vehicle systems and a management apparatus, in accordance with an example implementation. One or more vehicle systems 1801-1, 1801-2, 1801-3, and 1801-4 as described with respect to FIG. 17 are communicatively coupled to a network 1800 which is connected to a management apparatus 1802. The management apparatus 1802 manages a database 1803 and facilitates the function of an external server (e.g., as illustrated in FIG. 15). Database 1803 facilitates the functionality of the one or more databases described herein in example implementations, which contains data feedback aggregated from the vehicle systems in the network 1800. In alternate example implementations, the data feedback from the vehicle systems 1801-1, 1801-2, 1801-3, and 1801-4 can be aggregated to a central repository or central database such as proprietary databases that aggregate data from systems such as enterprise resource planning systems, and the management apparatus 1802 can access or retrieve the data from the central repository or central database. Such vehicle systems can include human operated vehicles such as cars, trucks, tractors, vans, and so on depending on the desired implementation. Depending on the desired implementation, vehicle systems can communicate with each other to transmit their respective data points over a communication systems such as vehicle to vehicle (V2V) and can be conducted based on proximity or other factors in accordance with the desired implementation.

Figure 19:
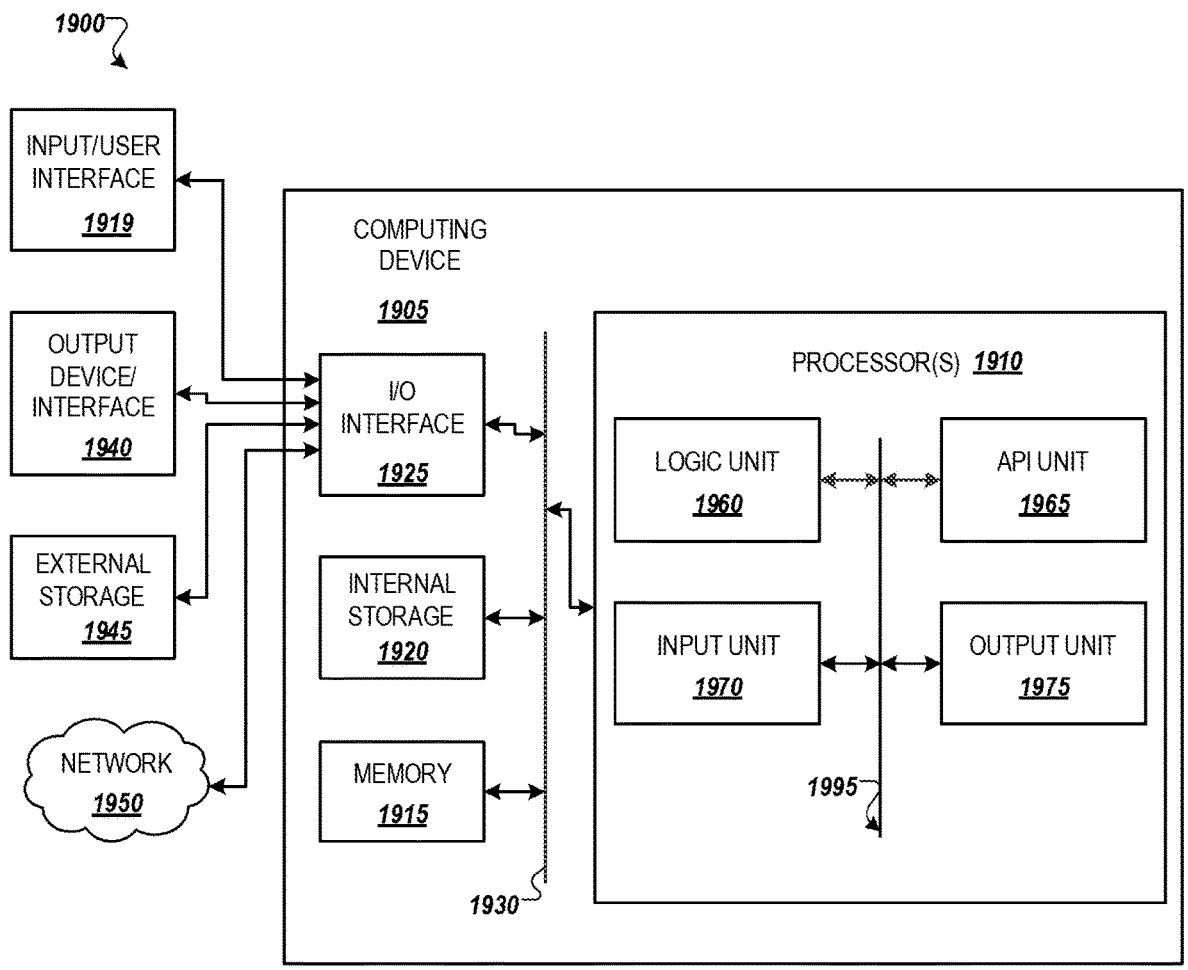
FIG. 19 illustrates an example computing environment with an example computer device suitable for use in some example implementations.

FIG. 19 illustrates an example computing environment with an example computer device suitable for use in some example implementations, such as for facilitating functionality for an on-board computer of a vehicle system to interact with an ECU 1 and map positioning unit 6 of a vehicle system as illustrated in FIG. 17, or a management apparatus 1802 as illustrated in FIG. 18 to facilitate the architectures and implementations described from FIGS. 1-16. All functions described herein can be implemented at the management apparatus 1802, at the vehicle system, or through a system based on some combination of such elements, depending on the desired implementation.

Computer device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and/or I/O interface 1925, any of which can be coupled on a communication mechanism or bus 1930 for communicating information or embedded in the computer device 1905. I/O interface 1925 is also configured to receive images from cameras or provide images to projectors or displays, depending on the desired implementation.

Computer device 1905 can be communicatively coupled to input/user interface 1935 and output device/interface 1940. Either one or both of input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1940 may include a display, television, monitor, printer, speaker, braille, or the like. In some example implementations, input/user interface 1935 and output device/interface 1940 can be embedded with or physically coupled to the computer device 1905. In other example implementations, other computer devices may function as or provide the functions of input/user interface 1935 and output device/interface 1940 for a computer device 1905.

Examples of computer device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1905 can be communicatively coupled (e.g., via I/O interface 1925) to external storage 1945 and network 1950 for communicating with any number of networked components, devices, and systems, including one or more computer devices of the same or different configuration. Computer device 1905 or any connected computer device can be functioning as, providing services of, or referred to as a server, client, thin server, general machine, special-purpose machine, or another label.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computer device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1905 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, input unit 1970, output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide output based on the calculations described in example implementations.

In an example implementation, memory 1915 and/or external storage 1945 can facilitate the functionality of the storage device as described herein to store one or more historical data points of vehicle state and vehicle location pairs.

Processor(s) 1910 can be configured to obtain state sensor information and location sensor information of a target vehicle, the state sensor information indicative of a vehicle state of the target vehicle, the location sensor information indicative of a location of the target vehicle as illustrated, for example in FIG. 4 and FIG. 13. State sensor information and location sensor information can be obtained from the state sensor and the location sensor as described in FIG. 17, from other vehicles directly as described in FIG. 18, or from an external server as described in FIG. 19.

Processor(s) 1910 can be configured to determine a behavior prediction of the target vehicle through determining potential state changes of the target vehicle based on comparing the vehicle state of the target vehicle and the location of the target vehicle to the one or more historical data points of vehicle state and vehicle location pairs as illustrated in FIGS. 6, 7 and 16, which illustrates the example data points pairing location with vehicle state in bold.

Based on the comparison of the vehicle state with historical data points of vehicle state and vehicle location pairs, processor(s) 1910 can be configured to control the vehicle system based on the behavior prediction of the target vehicle by sending instructions to ECU 1 to control the vehicle based on the predicted behavior as described in the implementations of FIG. 1-16.

In an example implementation, processor(s) 1910 can be configured to obtain traffic sensor information indicative of a traffic density in proximity to the target vehicle from a traffic system; and store the one or more historical data points of vehicle state and vehicle location pairs into the storage device based on a selection from historical data points within a distance of the target vehicle, the distance determined based on the traffic density and the vehicle state of the target vehicle as described in FIG. 8(*a*).

In an example implementation, processor(s) 1910 can be configured to obtain the one or more historical data points of the vehicle state and vehicle location pairs from a database, the database selected based on one or more of: a designation of a road type associated with the target vehicle being a major road type or minor road type, a vehicle type of the target vehicle, and a time of day in a week as illustrated in FIG. 12.

In an example implementation, if the target vehicle is a vehicle in front of the vehicle system (e.g., preceding the vehicle system), processor(s) 1910 can be configured to control the vehicle system based on the behavior prediction by instructing an electronics control unit (ECU) to reduce a speed of the vehicle system for the behavior prediction being indicative of deceleration of the target vehicle as illustrated in FIG. 7, FIG. 8(*b*), and FIG. 14.

In an example implementation in which the target vehicle is the vehicle system itself (e.g., the ego vehicle), processor(s) 1910 can be configured to control the vehicle system based on the behavior prediction of the target vehicle, for the behavior prediction indicative of the vehicle system heading towards a portion of a travel route in which speed is reduced, reducing the speed of the vehicle system based on the location of the target vehicle as illustrated in FIGS. 1-16. For example, in the example implementation of FIG. 7, the vehicle system may approach a road with a narrowing width during the travel route (e.g., an exit off of a freeway), wherein the prediction system would compare with other historical data points of vehicle location and vehicle state pairs to determine that vehicles decelerate when exiting a freeway. Other similar determinations can be made depending on the desired implementation based on the retrieved historical data points.

In an example implementation in which the target vehicle is a vehicle within proximity to the vehicle system (e.g., within a predefined distance), processor(s) 1910 can be configured to control the vehicle system based on the behavior prediction of the target vehicle by, for the behavior prediction indicative of the vehicle system heading towards a portion of a travel route in which speed is reduced, instructing an electronics control unit (ECU) to reduce/increase the speed of the vehicle system based on the location of the target vehicle as described in FIGS. 1-15. In an example implementation, the predefined distance can include vehicles that are laterally adjacent to the vehicle system (e.g., one lane over), behind the vehicle system, or otherwise depending on the desired implementation. In an example implementation, if the travel route indicates that two lanes are to be merged into one lane, based on the vehicle state/vehicle location pairs the vehicle system may thereby be instructed to reduce or increase the speed of the vehicle system depending on which lane the vehicle system is in and the position of the vehicle system in comparison to the target vehicle in the adjacent lane.

In an example implementation, processor(s) 1910 can be configured to provide a notification indicative of control being initiated before instructing an electronics control unit (ECU) to control the vehicle system as illustrated in FIG. 8(*b*).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
obtaining state sensor information and location sensor information of a target vehicle, the state sensor information indicative of a vehicle state of the target vehicle, the location sensor information indicative of a location of the target vehicle;
obtaining one or more historical data points of vehicle state and vehicle location pairs from a database;
obtaining traffic sensor information indicative of a traffic density in proximity to the target vehicle;
determining a behavior prediction of the target vehicle through determining potential state changes of the target vehicle based on comparing the vehicle state of the target vehicle and the location of the target vehicle to the one or more historical data points of the vehicle state and the vehicle location pairs; and
controlling a vehicle system based on the behavior prediction of the target vehicle;
wherein one or more, historical data points of vehicle state and vehicle location pairs are selected from historical data points within a distance of the target vehicle.

2. The method of claim 1, wherein the database is selected based on one or more of: a designation of a road type associated with the target vehicle being a major road type or minor road type, a vehicle type of the target vehicle, and a time of day in a week.

3. The method of claim 1, wherein the target vehicle is a vehicle in front of the vehicle system, wherein the controlling the vehicle system based on the behavior prediction comprises reducing a speed of the vehicle system for the behavior prediction being indicative of deceleration of the target vehicle.

4. The method of claim 1, wherein the target vehicle is the vehicle system, wherein the controlling the vehicle system based on the behavior prediction of the target vehicle comprises, for the behavior prediction indicative of the vehicle system heading towards a portion of a travel route in which speed is reduced, reducing the speed of the vehicle system based on the location of the target vehicle.

5. The method of claim 1, wherein the controlling a vehicle system based on the behavior prediction of the target vehicle comprises providing a notification in the vehicle system indicative of control being initiated before controlling the vehicle system.

6. A non-transitory computer readable medium, storing instructions for executing a process, the instructions comprising:
obtaining state sensor information and location sensor information of a target vehicle, the state sensor information indicative of a vehicle state of the target vehicle, the location sensor information indicative of a location of the target vehicle;
obtaining one or more historical data points of vehicle state and vehicle location pairs from a database;
obtaining traffic sensor information indicative of a traffic density in proximity to the target vehicle;
determining a behavior prediction of the target vehicle through determining potential state changes of the target vehicle based on comparing the vehicle state of the target vehicle and the location of the target vehicle to the one or more historical data points of the vehicle state and vehicle location pairs; and
controlling a vehicle system based on the behavior prediction of the target vehicle;
wherein the one or more historical data points of vehicle slate and vehicle location pairs are selected from historical data points within a distance of the target vehicle.

7. The non-transitory computer readable medium of claim 6, t wherein the database selected based on one or more of: a designation of a road type associated with the target vehicle being a major road type or minor road type, a vehicle type of the target vehicle, and a time of day in a week.

8. The non-transitory computer readable medium of claim 6, wherein the target vehicle is a vehicle in front of the vehicle system, wherein the controlling the vehicle system based on the behavior prediction comprises reducing a speed of the vehicle system for the behavior prediction being indicative of deceleration of the target vehicle.

9. The non-transitory computer readable medium of claim 6, wherein the target vehicle is the vehicle system, wherein the controlling the vehicle system based on the behavior prediction of the target vehicle comprises, for the behavior prediction indicative of the vehicle system heading towards a portion of a travel route in which speed is reduced, reducing the speed of the vehicle system based on the location of the target vehicle.

10. The non-transitory computer readable medium of claim 6, wherein the controlling a vehicle system based on the behavior prediction of the target vehicle comprises providing a notification in the vehicle system indicative of control being initiated before controlling the vehicle system.

11. A vehicle system, comprising:
a location sensor configured to measure a location of a target vehicle;
a state sensor configured to measure a vehicle state of the target vehicle;
a storage device configured to store one or more historical data points of vehicle state and vehicle location pairs;
and a processor, configured to:
obtain the one or more historical data points of the vehicle state and the vehicle location pairs from a database;
obtain traffic sensor information indicative of a traffic density in proximity to the target vehicle from a traffic system;
store the one or more historical data points of vehicle state and vehicle location pairs into the storage device based on a selection from historical data points within a distance of the target vehicle;
determine a behavior prediction of the target vehicle through determining potential state changes of the target vehicle based on comparing the vehicle state of the target vehicle and the location of the target vehicle to the one or more historical data points of the vehicle state and the vehicle location pairs; and
control the vehicle system based on the behavior prediction of the target vehicle.

12. The vehicle system of claim 11, wherein the database is selected based on one or more of: a designation of a road type associated with the target vehicle being a major road type or minor road type, a vehicle type of the target vehicle, and a time of day in a week.

13. The vehicle system of claim 11, wherein the target vehicle is a vehicle in front of the vehicle system, wherein the processor is configured to control the vehicle system based on the behavior prediction by instructing an electronics control unit (ECU) to reduce a speed of the vehicle system for the behavior prediction being indicative of deceleration of the target vehicle.

14. The vehicle system of claim 11, wherein the target vehicle is the vehicle system, wherein the processor is configured to control the vehicle system based on the behavior prediction of the target vehicle by, for the behavior prediction indicative of the vehicle system heading towards a portion of a travel route in which speed is reduced, instructing an electronics control unit (ECU) to reduce the speed of the vehicle system based on the location of the target vehicle.

15. The vehicle system of claim 11, wherein the processor is configured to provide a notification indicative of control being initiated before instructing an electronics control unit (ECU) to control the vehicle system.

16. The vehicle system of claim 11, wherein the target vehicle is a vehicle in proximity to the vehicle system, wherein the processor is configured to control the vehicle system based on the behavior prediction of the target vehicle by, for the behavior prediction indicative of the vehicle system heading towards a portion of a travel route in which speed is reduced, instructing an electronics control unit (ECU) to reduce the speed of the vehicle system based on the location of the target vehicle.

\* \* \* \* \*